UNITED STATES PATENT OFFICE.

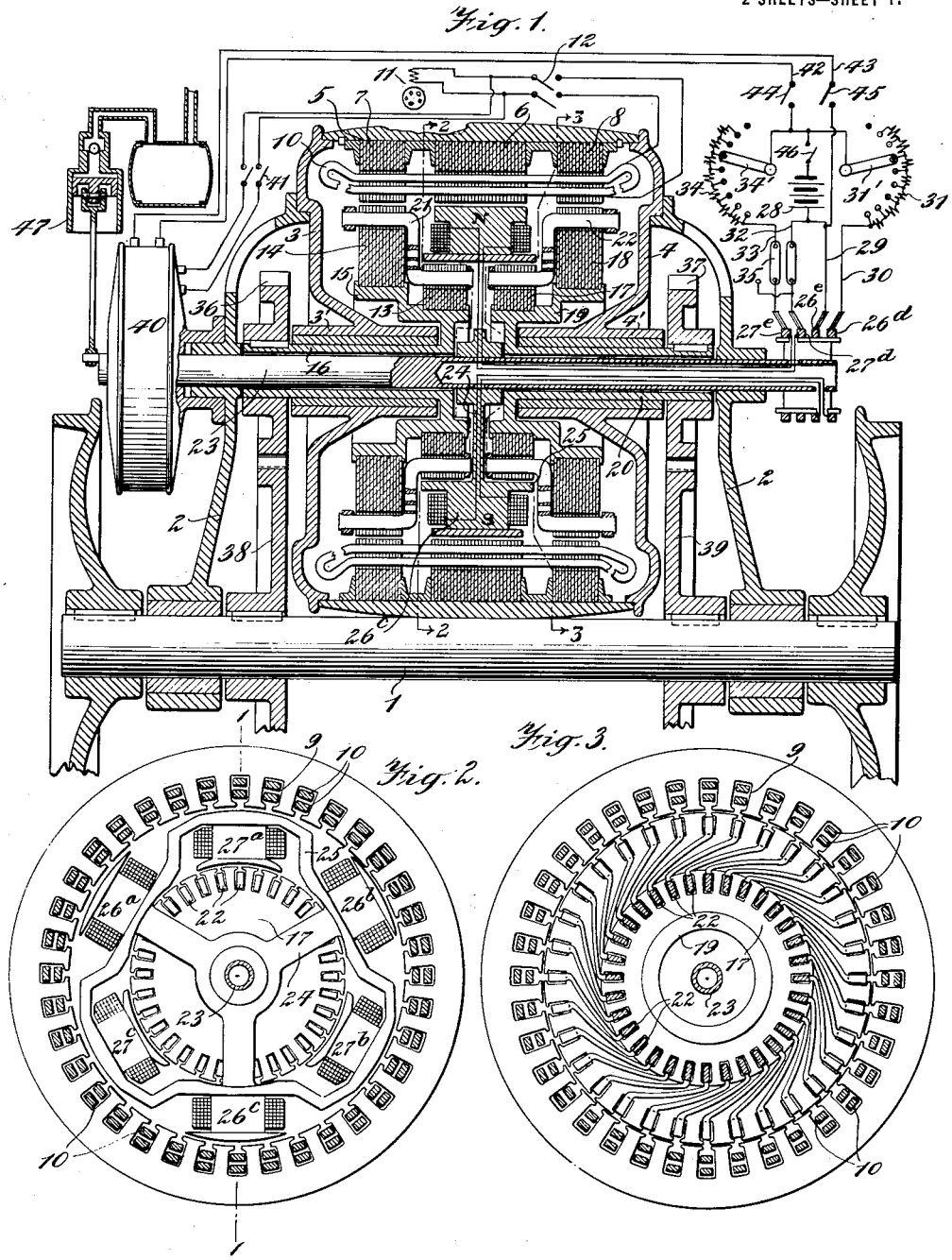

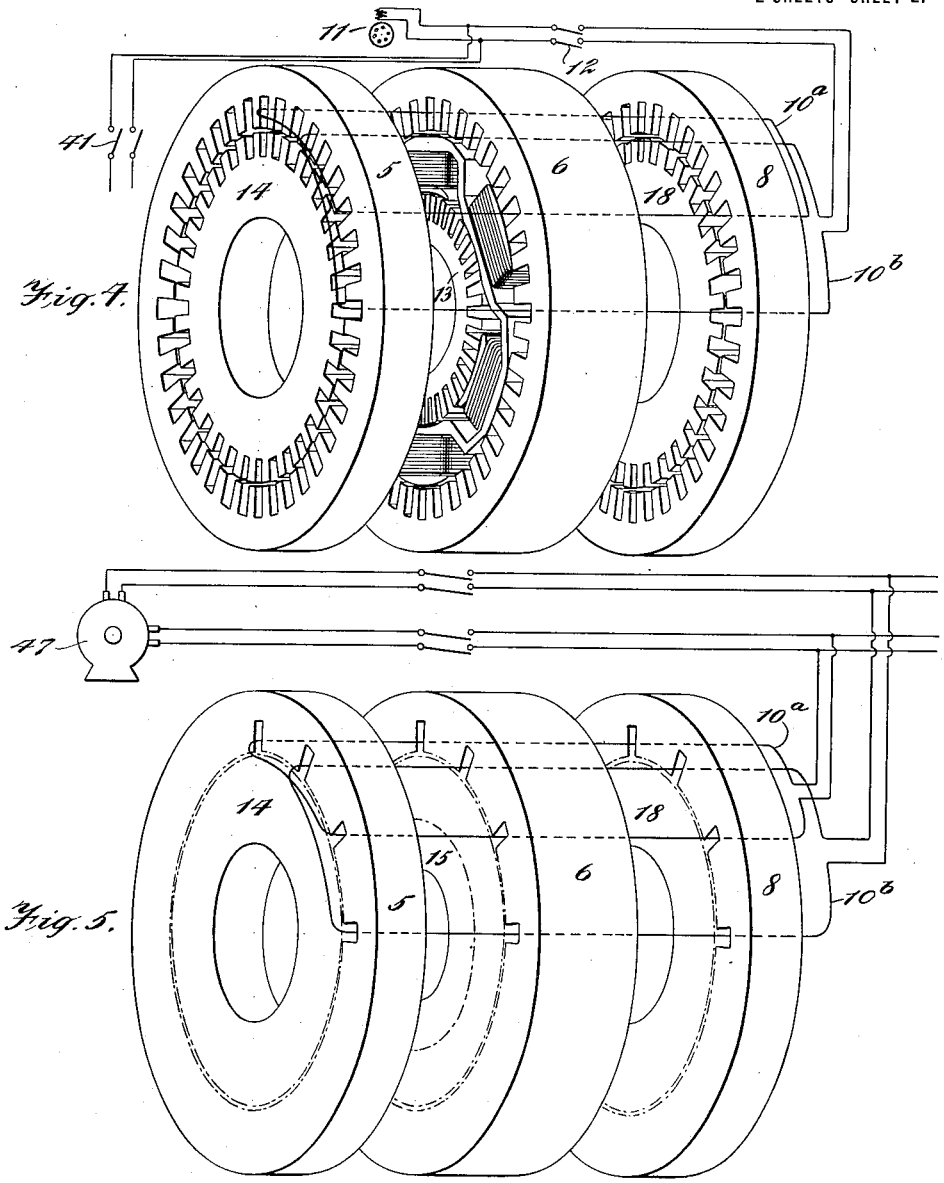

ALFONS H. NEULAND, OF NEW YORK, N. Y.

ALTERNATING-CURRENT MOTOR.

1,245,762.                     Specification of Letters Patent.           Patented Nov. 6, 1917.

Application filed August 7, 1915. Serial No. 44,245.

*To all whom it may concern:*

Be it known that I, ALFONS H. NEULAND, a subject of the Czar of Russia, residing at the city of New York, in the borough of Manhattan and State of New York, have invented certain new and useful Improvements in Alternating-Current Motors, of which the following is a full, clear, and exact description.

My invention relates to electric motors and particularly to the type of motor disclosed in my co-pending application Serial No. 870,785, filed Nov. 7, 1914. My invention has for a general object the production of such a motor operable with alternating current and particularly with single phase alternating current, the speed and torque of which may be varied within wide limits by simple mechanism and easy manipulation.

More specifically an object is to provide such a motor capable of regulation of its speed and torque by merely varying the strength of a magnetic field. Another object is to facilitate the reversal of motors of this character. More specifically an object is to provide for the reversal of such motors without manipulating the power leads thereof. Another object is to produce a motor of high efficiency. Another object is the provision of simple means for regulating the power factor of the motor causing the device to operate with leading or lagging current. Another object is to provide two independently driven members to enable the motor to apply power at two points. Another object is to provide a motor adapted to simultaneously apply power continuously to one power-consuming apparatus and intermittently, as desired, to another power-consuming apparatus. Another object is to provide common means for starting, synchronizing and energizing the rotative field element. Other objects are simplicity and compactness of construction and reliability of operation. Still other objects and advantages of my invention will appear from the following description.

To these ends my invention resides in the features of construction and arrangements and combinations of parts hereinafter more fully described and as pointed out in the appended claims.

Figure 1 is a longitudinal central section of a motor embodying my invention shown as connected to the axle of a pair of car wheels;

Fig. 2 is a transverse section of the same on the broken line 2—2 of Fig. 1, looking in the direction of the arrows;

Fig. 3 is a transverse section of the same taken upon the broken line 3—3 of Fig. 1, looking in the direction of the arrows;

Fig. 4 is a perspective and partially diagrammatic view of the three rotor and stator elements and the intermediate field element of the device when operating as a single phase alternating current motor, showing the arrangement of one consuming coil supplied with the single phase current and one generating and consuming coil closed upon itself, the other windings being omitted for the sake of clearness; and Fig. 5 is a diagrammatic view similar to Fig. 4 of the same parts of the device when operating as a polyphase alternating current motor, and showing both coils in electrical space quadrature to each other and supplied with polyphase alternating current.

The illustrated motor is mounted upon and operatively connected to the axle 1 of a trolley car or other conveyance, the axle having its bearing in a non-rotative casing or supporting brackets 2 which also forms a bearing for the motor and supports the motor casing. The motor casing includes two side plates 3 and 4 having central hub portions 3' and 4', and a cylindrical portion 5 supported by the side arms.

In the adaptation of my invention for use on trolley cars and other conveyances, I prefer to provide two independent rotor elements, from both of which power may be taken off independently. In this construction an additional second stator element is employed arranged on the opposite side of the first stator element, the second elements of each rotor being in inductive relation with two second stator elements, respectively. The stator members are carried upon the inner periphery of the cylindrical portion 5 of the motor casing and consist of three annular, laminated, co-axial, spaced stator elements, the central stator element 6 being somewhat wider than the two outer stator elements 7 and 8. The three stator elements are provided on their inner peripheries with a circumferential series of thirty-six slots 9, the slots of the three elements being in longitudinal alinement, and the stator winding 10 is wound in these slots.

In the construction shown in Figs. 1 and 4, a source 11 of single phase alternating current is employed, and in this construction as illustrated the stator winding is wound for two phases, the coils of both phases extending through all stators, and one phase winding $10^a$ is short circuited as shown in Fig. 4, and the other phase $10^b$ is connected to the source 11 of alternating current, a switch 12 being provided in the supply circuit. The two windings are displaced with regard to one another 90 electrical space degrees.

Two internal rotor members coöperate with the stator and each rotor comprises two spaced laminated rotor elements mounted upon a sleeve, and these sleeves bear in the respective hubs 3' and 4' of the side plates 3 and 4. The outside rotor elements of each rotor member are of larger diameter than the inside elements, this being for the purpose of accommodating the rotative field member in the annular space between the middle stator element 6 and the two inside rotor elements, while the two outside rotor elements are of sufficient diameter to fit within the outside stator elements 7 and 8, respectively, with the intervention of only a slight air gap.

The inside or inner rotor element 13 and the outside or outer rotor element 14 of the rotor member on the left side of the machine are mounted upon the core portion 15 of the sleeve 16, and the inner rotor element 17 and the outer rotor element 18 of the rotor member on the right side are mounted upon the core portion 19 of the sleeve 20. Suitable bushings are interposed between the sleeves 16 and 20 and the respective hubs 3' and 4'. The two outer rotor elements 14 and 18 are disposed concentrically within the stator elements 7 and 8 respectively, and the two inner rotor elements 13 and 17 are disposed side by side concentrically within the middle stator element 6. The two elements 13 and 14 of the rotor on the left side are connected by a squirrel-cage winding 21 and the rotor elements 17 and 18 of the rotor on the right side are provided with a common squirrel-cage winding 22, the bars of the two squirrel-cage windings being offset in the two outer elements relative to their position in the two inner elements 30 mechanical degrees which is equivalent to 90 electrical space degrees, there being six poles on the field member, as will presently appear. This offsetting of the bars brings the stator and rotor poles in the two outside pairs of elements 90 electrical space degrees out of alinement, or in electrical space quadrature, in order that a torque be produced upon the rotor field by the stator field. This quadrature relation and, therefore, the torque is preserved at all speeds of the rotor.

The rotative field member is carried by a central longitudinal shaft 23 which bears in the casing 2 and is surrounded by the two rotor sleeves 16 and 20. This shaft 23 is provided substantially at its middle with a radial spider 24 disposed between the two inner rotor members 13 and 17, and this spider is integral with the ring 25 of the field member. While the field may consist of a single set of poles acting on both the stator and rotor windings, as in my said copending application, in the preferred form the field member will have, as illustrated, two independent fields acting on the respective windings. As shown the ring 5 is a steel ring of irregular shape, and is provided with three external integral pole pieces $26^a$, $26^b$ and $26^c$, and with three internal integral pole pieces $27^a$, $27^b$ and $27^c$, the external pole pieces forming the cores of the stator field magnets of one polarity while the intermediate portions of the ring form poles of opposite polarity, and the internal pole pieces and corresponding intermediate ring portions forming the pole faces of the rotor field. The field coils of the stator field are wound in like direction, and are connected in series, and similarly the field coils of the internal or rotor field are wound in the same direction, but opposite to that of the stator field coils, and are connected in series. The portions of the ring 25 extending between the polar projections form magnetic yokes connecting the external pole faces formed by the ring portions with the adjacent internal pole faces formed by the ring portions. Therefore, when the stator and rotor fields are equally and oppositely excited the flux of each adjacent pair of field poles traverses both pole pieces and the connecting portions of the rotor and stator, without traversing any yoke portions of the ring joining the internal and external pole faces, but when the rotor and stator fields differ in strength, the difference between the stator and rotor fluxes traverses the ring, and when the two fields are opposed to each other the sum of the fluxes traverses the yokes. Hence, either the rotor or stator field may be varied or reversed without materially affecting the other.

The two fields are independently energized through the source of current supplied to four slip rings $26^d$, $26^e$, $27^d$ and $27^e$ on one end of the shaft 23, which projects through the casing 2. The shaft 23 is made partially hollow, as shown, to accommodate the wires connecting the fields with the slip rings, the rings $26^d$ and $26^e$ being connected to the stator field winding, and the rings $27^d$ and 27° being connected to the rotor field winding.

The source of magnetizing current for the fields is shown as a battery 28 connected in multiple to the respective slip rings of the two fields. The battery is connected to the stator field slip rings through the leads 29 and 30, which circuit includes the stator field rheostat 31, one pole of the battery 28 being connected to the lead 29 and the other pole being connected to the rheostat handle 31', the lead 30 in the stator field circuit being connected to the rheostat winding. Similarly, the rotor field slip rings are connected to the battery 28 through the leads 32 and 33, one pole of the battery being connected to the lead 32 and the other pole being connected to the handle 34' of the rheostat 34, the lead 33 being connected to the rheostat winding. A pole changer 35 is provided in this rotor field circuit.

As above stated, the adjustment of the rheostat handle 31' serves to vary the intensity of the stator field and thereby vary the power factor of the device, while the adjustment of the rheostat handle 34' serves to vary the rotor field and thereby vary the speed and torque of the driven members.

To start the device the field member is brought up to speed by an auxiliary device and synchronized with the alternating current. The stator field is then energized and the switch 12 is closed, after which the field member rotates at all times at this synchronous speed. A rotative field is formed in the second stator elements, or the ones which are in inductive relation to the rotor elements, by means of a single phase current from the source 11, which is fed to the phase 10$^b$ of the winding, and by means of another component out of phase with the first which is generated in phase 10$^a$ of the winding by the rotating stator field. The rotors and with them the car wheels are started by gradually energizing the rotor field, which is done by moving the handle 34' counter-clockwise, cutting out more and more resistance. The rotation of the rotor field of the field member induces a current in the rotor windings; a torque is thereby produced upon the rotors, and the rotors are thereby caused to rotate. The current in the rotor windings also flows in those parts of the rotors opposing the second stator elements, which coöperate with the revolving field of the second stator element to produce a torque upon the rotors. When the rotors follow the field member, the rotor frequency decreases resulting in a slowing-up of the field in the rotors; due to rotation of the rotors, however, in the same direction as the rotor field, a slowing-up of the rotor fields is accompanied by a corresponding increase of the rotor velocity; thus the rotor velocity is added to the rotor field velocity, and the resultant rotor field velocity is equal to that of the stator field.

The motor is operatively connected to the axle 1 by means of pinions 36 and 37 fixed on the respective rotor sleeves 16 and 20, and engaging gear wheels 38 and 39 respectively, on the axle 1. The advantages of thus applying power at two points by two independently driven members will be readily understood by those skilled in the art.

For motive power to bring the field member up to synchronism a motor 40 on the shaft 23 may be employed which is connected with the source 11 of alternating current, the connection being controlled by a switch 41, and if desired the starting and synchronizing motor may also act as a converter after the field member has become synchronized, and convert the alternating current into direct current, which may be fed through the leads 42 and 43 to the field circuits or if of another type it may generate the required direct current and in that case be disconnected from the single phase supply after starting and synchronizing the field member. This forms an alternative source of supply for the magnetizing current which may be cut out by switches 44 and 45 if desired, or the battery may be cut out by switch 46 if the converted or generated current is used to energize the fields.

Since the rotative field member is continuously operating, it may be employed to operate the air pump 47, the compressing piston being connected to the shaft 23 by a suitable crank and pitman.

It will be observed that the continuously rotating shaft 23 may be easily oiled, and that the construction generally possesses the advantages of convenience and accessibility, while being simple and exceedingly compact.

As has been hereinabove pointed out when the device is to be put in operation, deriving its power from a single phase source of supply, the field member is first brought up to speed, the stator field excited and the winding 10$^b$ connected to the source of single phase supply which produces an alternating magnetic field in all three stators and causing the centrally arranged rotative field member to rotate in synchronism therewith. The rotation of the field member generates a current, in the winding closed upon itself, in electrical time quadrature to the impressed single phase current and thus the impressed single phase current coöperates with the generated quadrature current to produce a revolving field in the stator of the second or end stator elements.

The rotation of the field element also generates polyphase currents in the squirrel-cage windings of the rotors which, being conducted through the bars to the end rotors, produce therein another rotating field which is in electrical space quadrature to the rotating stator field and co-acting therewith produces a torque upon the rotor.

Variations in speed of this form of the invention are obtained by varying the strength of the rotor field on the field member, thereby varying the strength of the rotative field of the second rotor element. The apparatus is reversed in two ways; the first method is to stop the field member, start and synchronize it in the opposite direction whereupon the rotor elements will also be made to rotate in the opposite direction. The second method is to leave the field member running in a clockwise direction, but change either the stator or the rotor poles of the second structure which in the present embodiment is preferably done by reversing the pole changer 35 in the rotor field circuit of the rotatable field member. When a relatively weak rotor field is used, large currents are generated which, however, lag considerably behind the voltage and hence produce a relatively small clockwise torque in the generating rotor element due to the lag, but which currents produce a relatively high torque in the second or consuming rotor element due to their full quadrature relation with respect to the stator currents which are made to have the required phase relation by adjusting the value of the direct current producing the rotating stator field of the field member. Thus the high torque on the second rotor elements in a counter-clockwise direction far exceeds the low torque on the first rotor elements in a clockwise direction and consequently causes the rotor to revolve in a counter-clockwise direction.

When the supply current is polyphase, each phase of the stator winding 10 will be fed by a different phase from the source of current. This is illustrated in Fig. 5 where the stator winding is shown as a two-phase winding, and the generator 47 is shown as a two-phase generator. The coils 10ª in this case are connected to the conductors of one phase of the alternating current, instead of being short circuited, while the coils 10ᵇ are connected to the conductors of the other phase.

It is obvious that various modifications may be made in the construction shown in the drawing and above particularly described, within the principle and scope of my invention.

I claim:

1. An alternating current motor comprising a stator and a winding therefor, a source of alternating current for the stator winding, a rotor and a current carrying winding therefor arranged in inductive relation to the stator winding, a rotative field member having a flux component cutting the stator winding and a flux component cutting the rotor winding, and means for displacing the phase of the rotor current substantially 180 degrees.

2. An alternating current motor comprising two independent rotor elements and windings therefor, a field member rotative in inductive relation to the windings of both rotors, a stator and a winding therefor in inductive relation to both rotor windings, and a source of alternating current for one part of the stator winding, the field member being inductively related to the stator windings and rotatable in synchronism with the alternating current, thereby generating an alternating current in another part of the stator winding, whereby a revolving field is produced in the stator and a torque is produced upon both of the rotors by the inductive action of the field member causing the rotors to rotate, and the revolving fields of the rotors coöperating with the revolving field of the stator to produce another torque on both of the rotors; and means for taking off power independently from the two rotors.

3. An alternating current motor comprising a stator having two stator elements and interconnected windings therefor arranged for more than one phase, a source of single phase alternating current for one of the phases of the winding, a rotor having two rotor elements and a winding common to the two elements, the windings in the second rotor and stator elements being in inductive relation, and a field member rotative synchronously by the supply current having a stator flux component cutting the winding of the first stator element and generating in the other phase winding a current out of phase with the supply and a rotor flux component cutting the winding of the first rotor element and generating a current therein and producing a torque thereon, whereby a rotating field is produced in the second stator element and another rotating field is produced in the second rotor element, the two fields co-acting to produce a continuous torque on the rotor.

4. An alternating current motor comprising a stator having two stator elements and interconnected windings therefor arranged for more than one phase, a source of single phase alternating current for one of the phases of the winding, a rotor having two rotor elements and a winding common to the two elements, the windings in the second rotor and stator elements being in inductive relation, and a field member rotative synchronously by the supply current having a stator flux component cutting the winding of the first stator element and generating in the other phase winding a current out of phase with the supply and a rotor flux component cutting the winding of the first rotor element and generating a current therein and producing a torque thereon, whereby a rotating field is produced in the second stator element and another rotating field is produced in the second rotor element, the two fields co-acting to produce a continuous torque on the rotor, and means for varying the strength of the rotor current.

5. An alternating current motor comprising a stator having two stator elements and interconnected windings therefor arranged for more than one phase, a source of single phase alternating current for one of the phases of the winding, a rotor having two rotor elements and a winding common to the two elements, the windings in the second rotor and stator elements being in inductive relation, a field member rotative synchronously by the supply current having a stator flux component cutting the winding of the first stator element and generating in the other phase winding a current out of phase with the supply and a rotor flux component cutting the winding of the first rotor element and generating a current therein and producing a torque thereon, whereby a rotating field is produced in the second stator element and another rotating field is produced in the second rotor element, the two fields co-acting to produce a continuous torque on the rotor, and means for displacing the phase of the rotor current substantially 180 degrees.

6. An alternating current motor comprising a stator having two stator elements and interconnected windings therefor arranged for more than one phase, a source of single phase alternating current for one of the phases of the winding, a rotor having two rotor elements and a winding common to the two elements, the windings in the second rotor and stator elements being in inductive relation, a field member rotative synchronously by the supply current having a stator flux component cutting the winding of the first stator element and generating in the other phase winding a current out of phase with the supply and a rotor flux component cutting the winding of the first rotor element and generating a current therein and producing a torque thereon, whereby a rotating field is produced in the second stator element and another rotating field is produced in the second rotor element the two fields co-acting to produce a continuous torque on the rotor, and means for varying the rotor flux component.

7. An alternating current motor comprising two stator elements and interconnected windings therefor, a source of alternating current for the stator windings, two mechanically connected rotor elements and interconnected windings therefor, the windings for the second rotor and stator elements being inductively related, a rotative field member having on one face a plurality of stator magnetic pole faces forming a stator field cutting the winding of the first stator element and having on another face a plurality of rotor magnetic pole faces forming a rotor field in inductive relation to the winding of the first rotor element, means for independently varying the strength of the two fields, and means for reversing the direction of the rotor field.

8. An alternating current motor comprising two stator elements and interconnected windings therefor, a source of alternating current for the stator windings, two mechanically connected rotor elements and a squirrel-cage winding common to the two elements, the winding on the second rotor element being in inductive relation to the winding on the second stator element, a rotative field member having on one face a plurality of stator magnetic poles forming a stator field cutting the winding of the first stator element and having on another face a plurality of rotor magnetic poles forming a rotor field in inductive relation to the squirrel-cage winding in the first rotor element, whereby the field member is caused to rotate in synchronism with the alternating current and revolving fields are formed in the second rotor and stator elements which coöperate to produce a continuous torque on the rotor, and means for varying the strength and direction of the rotor field independently of that of the stator field.

9. An alternating current motor comprising three co-axial stator elements and interconnected windings therefor, a source of alternating current for the stator windings, two independently rotatable rotor members, each rotor member including two mechanically connected rotor elements and interconnected windings therefor, the two outer rotor elements of each member being concentric with the respective outer stator elements, the windings of the concentric elements being in inductive relation, the two inner rotor elements being concentric with the intermediate stator element, and a rotative field member disposed between the intermediate stator element and the two inner rotor elements, the flux thereof cutting both the stator winding and the two rotor windings, whereby the field member is caused to rotate in synchronism with the alternating current supply and revolving fields are formed in the two outer pairs of elements which coöperate to produce continuous independent torques on the rotor members.

10. An alternating current motor comprising three co-axial stator elements and interconnected windings therefor, a source of alternating current for the stator windings, two independently rotatable rotor members, each rotor member including two mechanically connected rotor elements and interconnected windings therefor, the two outer rotor elements of each member being surrounded by the respective outer stator elements and the windings of the two outer rotor elements being in inductive relation with those of the respective surrounding stator elements and the two inner rotor elements being surrounded by the intermediate stator elements, and a rotative field member disposed between the intermediate stator element and the two inner rotor elements, the flux thereof cutting both the stator winding and the two rotor windings.

11. An alternating current motor comprising three co-axial stator elements and interconnected windings therefor, a source of alternating current for the stator windings, two independently rotatable rotor members, each rotor member including two mechanically connected rotor elements and interconnected windings therefor, the two outer rotor elements of each member being concentric with the respective outer stator elements, the windings of the concentric elements being in inductive relation, and the two inner rotor elements being concentric with the intermediate stator element, a rotative field member having a stator flux component cutting the winding of the intermediate stator element and a rotor flux component cutting the windings of the two inner rotor elements, whereby the field member is caused to rotate in synchronism with the alternating current supply and revolving fields are formed in the two outer pairs of elements which coöperate to produce continuous independent torques on the rotor members.

12. An alternating current motor comprising three co-axial stator elements and interconnected windings therefor, a source of alternating current for the stator windings, two independently rotatable rotor members, each rotor member including two mechanically connected rotor elements and interconnected windings therefor, the two outer rotor elements of each member being concentric with the respective outer stator elements, the windings of the concentric elements being in inductive relation, the two inner rotor elements being concentric with the intermediate stator element, a rotative field member having a stator flux component cutting the winding of the intermediate stator element and a rotor flux component cutting the windings of the two inner rotor elements, whereby the field member is caused to rotate in synchronism with the alternating current supply and revolving fields are formed in the two outer pairs of elements which coöperate to produce continuous independent torques on the rotor members, and means for varying the armature flux component relative to that of the stator flux component.

13. An alternating current motor comprising three co-axial stator elements and interconnected windings therefor, a source of alternating current for the stator windings, two independently rotatable rotor members, each rotor member including two mechanically connected rotor elements and interconnected windings therefor, the two outer rotor elements of each member being concentric with the respective outer stator elements, the windings of the concentric elements being in inductive relation, the two inner rotor elements being concentric with the intermediate stator element, a rotative field member having a stator flux component cutting the winding of the intermediate stator element and a rotor flux component cutting the windings of the two inner rotor elements, whereby the field member is caused to rotate in synchronism with the alternating current supply and revolving fields are formed in the two outer pairs of elements which coöperate to produce continuous independent torques on the rotor members, and means for varying the quantity and direction of the armature flux component relative to that of the stator flux component.

14. An alternating current motor comprising three co-axial stator elements and interconnected windings therefor, a source of alternating current for the stator windings, two independently rotatable rotor members, each rotor member including two mechanically connected rotor elements and interconnected windings therefor, the two outer rotor elements of each member being surrounded by the respective outer stator elements and the windings of the two outer rotor elements being in inductive relation with those of the respective surrounding stator elements and the two inner rotor elements being surrounded by the intermediate stator elements, a rotative field member having on one face a plurality of stator magnetic poles forming a stator field cutting the winding of the intermediate stator element and having on another face a plurality of rotor magnetic poles forming a rotor field cutting the windings of the two inner rotor elements, whereby the field member is caused to rotate in synchronism with the alternating current supply and revolving fields are formed in the two outer pairs of elements which coöperate to produce continuous independent torques on the rotor members, and means for varying the strength of the rotor field relative to that of the stator field.

15. An alternating current motor comprising three co-axial stator elements and interconnected windings therefor, a source of alternating current for the stator windings, two independently rotatable rotor members, each rotor member including two mechanically connected rotor elements and interconnected windings therefor, the two outer rotor elements of each member being surrounded by the respective outer stator elements and the windings of the two outer rotor elements being in inductive relation with those of the respective surrounding stator elements and the two inner rotor elements being surrounded by the intermediate stator elements, a rotative field member having on one face a plurality of stator magnetic poles forming a stator field cutting the winding of the intermediate stator element and having on another face a plurality of rotor magnetic poles forming a rotor field cutting the windings of the two inner rotor elements, whereby the field member is caused to rotate in synchronism with the alternating current supply and revolving fields are formed in the two outer pairs of elements which co-operate to produce continuous independent torques on the rotor members, and means for varying the strength and direction of the rotor field relative to those of the stator field.

16. An alternating current motor comprising three co-axial stator elements, interconnected windings therefor, a source of alternating current for the stator windings, two independently rotatable rotor members, each rotor member including two mechanically connected rotor elements and an induced squirrel-cage winding common thereto, the two outer rotor elements of each member being concentric with the respective outer stator elements and the portion of the squirrel-cage bars upon the second rotor element of each rotor member being in inductive relation to the winding of the concentric stator element and being circumferentially displaced substantially 90 electrical space degrees relative to the portion of the bars upon the first rotor element, and the two inner rotor elements being concentric with the intermediate stator element, a rotative field member having a stator flux component cutting the winding in the intermediate stator element, a rotor flux component cutting the windings of the two inner rotor elements, and means for varying the quantity of the rotor flux component relative to the stator flux component.

17. An alternating current motor comprising three co-axial stator elements, interconnected windings therefor, a source of alternating current for the stator windings, two independently rotatable rotor members, each rotor member including two mechanically connected rotor elements and an induced squirrel-cage winding common thereto, the two outer rotor elements of each member being concentric with the respective outer stator elements and the portion of the squirrel-cage bars upon the second rotor element of each rotor member being in inductive relation to the winding of the concentric stator element and being circumferentially displaced substantially 90 electrical space degrees relative to the portion of the bars upon the first rotor element, and the two inner rotor elements being concentric with the intermediate stator element, a rotative field member having on one face a plurality of stator magnetic pole faces forming a stator field cutting the winding of the intermediate stator element and having on another face a plurality of rotor magnetic pole faces forming a rotor field cutting the windings in the two inner rotor elements, and means for varying the strength and direction of the rotor field relative to that of the stator field.

18. In combination with a rotative element to be driven having two gear wheels fixed thereon and a non-rotative casing supported thereby, an alternating current motor for driving the rotative element comprising three co-axial stator elements, interconnected windings therefor, a source of alternating current for the stator winding, two independently rotatable rotor members and a pinion carried by each rotor member meshing with the respective gear wheels, each rotor member including two mechanically connected rotor elements and interconnected windings therefor, the outer rotor elements of each member being concentric with the respective outer stator elements and the windings of the concentric elements being in inductive relation and the two inner rotor elements being concentric with the intermediate stator element, a rotative shaft bearing in the casing, and a field member mounted thereon having on one face a plurality of stator magnetic pole faces forming a stator field cutting the winding on the intermediate stator element and having on another side a plurality of rotor magnetic pole faces forming a rotor field in inductive relation to the windings of the two inner rotor elements.

19. In combination with a rotative element to be driven having two gear wheels fixed thereon and a non-rotative casing supported thereby, an alternating current motor for driving the rotative element comprising three co-axial stator elements, interconnected windings therefor, a source of alternating current for the stator winding, two independently rotatable rotor members and a pinion carried by each rotor member meshing with the respective gear wheels, each rotor member including two mechanically connected rotor elements and interconnected windings therefor, the outer rotor elements of each member being concentric with the respective outer stator elements and the windings of the concentric elements being in inductive relation and the two inner rotor elements being concentric with the intermediate stator element, a rotative shaft bearing in the casing, a field member mounted thereon having on one face a plurality of stator magnetic pole faces forming a stator field cutting the winding on the intermediate stator element and having on another side a plurality of rotor magnetic pole faces forming a rotor field in inductive relation to the windings of the two inner rotor elements, and means for independently energizing the two fields.

20. An alternating current motor comprising two stator elements and interconnected windings therefor, a source of alternating current for the stator windings, two mechanically connected rotor elements and interconnected windings therefor, the windings for the second rotor and stator elements being inductively related, a rotative field member having a flux component cutting the winding of the first stator element and another flux component cutting the winding of the first rotor element, and a member for starting, energizing and synchronizing the field member operative to rotate the field member to synchronize the same with the alternating current and to supply energizing current to the field member.

21. In combination with a rotative element to be driven having two gear wheels fixed thereon and a non-rotative casing supported thereby, an alternating current motor for driving the rotative element comprising three co-axial stator elements, interconnected windings therefor, a source of alternating current for the stator winding, two independently rotatable rotor members and a pinion carried by each rotor member meshing with the respective gear wheels, each rotor member including two mechanically connected rotor elements and interconnected windings therefor, the outer rotor elements of each member being concentric with the respective outer stator elements and the windings of the concentric elements being in inductive relation and the two inner rotor elements being concentric with the intermediate stator element, a rotative shaft bearing in the casing, a field member mounted thereon having on one face a plurality of stator magnetic pole faces forming a stator field cutting the winding on the intermediate stator element and having on another face a plurality of rotor magnetic pole faces forming a rotor field in inductive relation to the windings of the two inner rotor elements, and an electrical translating device connected to the source of alternating current and operatively connected to the rotative shaft and adapted to rotate the field member to synchronize the same with the alternating current and to supply energizing current to the two fields.

In witness whereof I subscribe my signature in the presence of two witnesses.

ALFONS H. NEULAND.

Witnesses:
  VICTOR D. BORST,
  WALDO M. CHAPIN.